United States Patent

Lewis et al.

Patent Number: 6,022,817
Date of Patent: *Feb. 8, 2000

[54] FABRIC FOR AIRBAG

[75] Inventors: Kirk Reginald Lewis; Geoffrey St. Quentin Whitfield, both of Ontario, Canada

[73] Assignee: E. I. du Pont de Nemours and Company, Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/871,876

[22] Filed: Jun. 6, 1997

[51] Int. Cl.⁷ .................. D03D 1/00; D03D 1/02
[52] U.S. Cl. .......... 442/189; 442/181; 428/36.1; 139/389; 280/728.1
[58] Field of Search ............... 442/181, 189; 428/36.1; 139/389; 280/728.1

[56] References Cited

U.S. PATENT DOCUMENTS

| | | |
|---|---|---|
| 4,977,016 | 12/1990 | Thornton et al. ............ 428/225 |
| 5,073,418 | 12/1991 | Thornton et al. . |
| 5,093,163 | 3/1992 | Krummheuer et al. . |
| 5,236,775 | 8/1993 | Swoboda et al. . |
| 5,302,432 | 4/1994 | Shigeta et al. . |
| 5,470,106 | 11/1995 | Nishimura et al. . |
| 5,477,890 | 12/1995 | Krummheuer et al. . |
| 5,508,073 | 4/1996 | Krummheuer et al. ........ 428/35.1 |
| 5,540,965 | 7/1996 | Nishimura et al. ........... 428/36.1 |
| 5,554,424 | 9/1996 | Krummheuer et al. ........ 428/35.2 |
| 5,581,856 | 12/1996 | Krummheuer et al. ........ 26/18.5 |
| 5,637,114 | 6/1997 | Hohnke ............................. 8/137 |
| 5,650,207 | 7/1997 | Crouch ............................ 428/36.1 |
| 5,657,798 | 8/1997 | Krummheuer et al. ........ 139/420 A |
| 5,693,392 | 12/1997 | Bergen et al. ................... 428/36.1 |

FOREIGN PATENT DOCUMENTS

| | | | |
|---|---|---|---|
| 0 501 295 | 9/1992 | European Pat. Off. ........ D03D 1/02 |
| 0 616 061 | 9/1994 | European Pat. Off. ........ D03D 1/02 |
| 0 738 793 | 10/1996 | European Pat. Off. ........ D02G 3/44 |
| 0 763 621 A2 | 3/1997 | European Pat. Off. ........ D06N 3/12 |
| 1-041438 | 2/1989 | Japan ........................ B60R 21/16 |
| 1-070247 | 3/1989 | Japan ........................ B60R 21/16 |
| 4-176750 | 6/1992 | Japan ........................ B60R 21/16 |
| 4-209846 | 7/1992 | Japan ........................ D03D 1/02 |
| 5-214632 | 8/1993 | Japan ........................ D03D 1/02 |
| 6-184856 | 7/1994 | Japan ........................ B60R 21/16 |
| 7-048717 | 2/1995 | Japan ........................ B60R 21/16 |
| 7-090746 | 4/1995 | Japan ........................ D03D 1/02 |
| 07300054 | 11/1995 | Japan ........................ B60R 21/16 |
| WO 96/05985 | 2/1996 | WIPO ........................ B60R 21/16 |
| WO 97/37068 | 10/1997 | WIPO ........................ D03D 1/02 |
| WO 98/00592 | 1/1998 | WIPO ........................ D03D 1/02 |

*Primary Examiner*—Terrel Morris
*Assistant Examiner*—Cheryl Juska

[57] ABSTRACT

Synthetic filament yarn fabric for manufacturing an air bag is manufactured from polyamide yarn having a linear density within the range of five hundred fifty (550) to six hundred fifty (650) dtex, and a filament count in the range of one hundred (100) to one hundred twenty-five (125). The fabric has a Strength-Weighted Dynamic Permeability in the range of 0.1 to 0.3 (l·mm/dm²·min·kPa), and more particularly, in the range of 0.20 to 0.25 (l·mm/dm²·min·kPa).

3 Claims, 1 Drawing Sheet

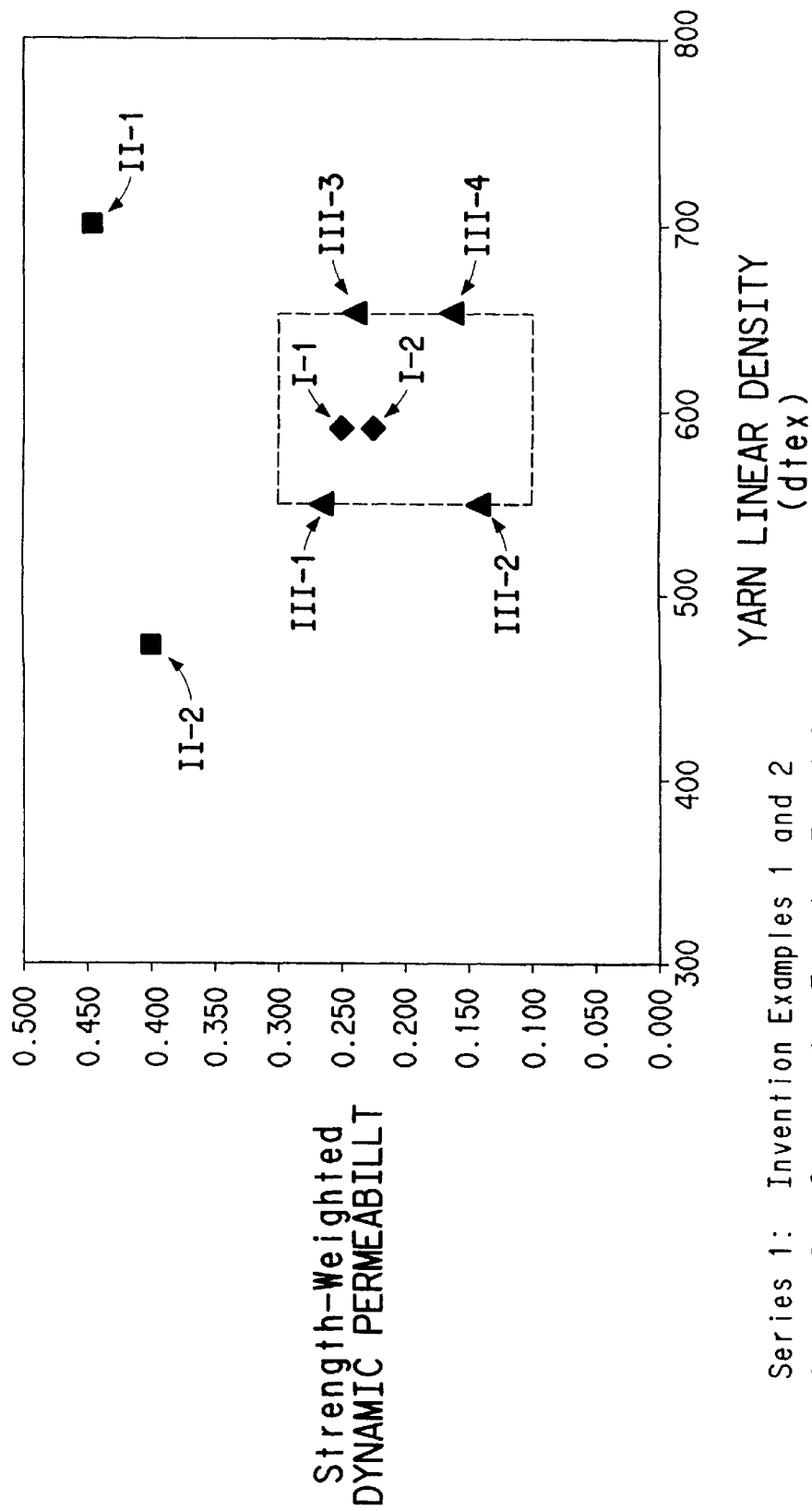

FABRIC FOR AIRBAG

BACKGROUND OF THE INVENTION

1. Field of the Invention

The present invention relates to a synthetic filament yarn fabric for manufacturing an air bag.

2. Description of the Prior Art

The primary requisite of a fabric used for the manufacture of air bags is strength, with particular emphasis on the ability of the fabric to resist tearing and bursting. High strength is imparted to an airbag fabric by employing high tenacity yarns, preferably of nylon 6,6, of high mechanical quality. The linear density of the yarns, and the concomitant weaving intensity, [expressed (for example) by the total number of warp crimps in one square meter of fabric], are chosen to ensure that the strength requirement is met after weaving into selected patterns and finishing of the fabric by various means. Most commonly, a single layer, plain weave pattern is chosen because this pattern has the highest levels of crimp for a given fabric construction, i. e., yarn linear density and fabric sett. This latter attribute is described by the ends/centimeter of the warp yarn and the picks/centimeter of the fill yarn.

Whereas high strength is a necessary attribute of an air bag fabric, there are other requirements which must be additionally met. Of these additional attributes, low air permeability and good flexibility are particularly important.

In the rapid deployment of an air bag, the fabric is subjected to high operating pressures. Airbag operating pressures are orders of magnitude greater than those employed in the standard methods for the determination of the air permeability of the fabric. Whereas standard test pressures range up to 0.20 kPa, it is now common practice to generate data important to the estimation of the permeability of the fabric under practical conditions at a pressure of 2.5 kPa. It is on this "Dynamic" permeability, rather than so-called "Static" permeabilities, that selection of yarn geometry, and fabric construction and fabrication methods, are appropriately based.

Associated with good flexibility, for the purpose of being able to compactly store the airbag fabric, is the requirement of low thickness. It is also desirable that the fabric be of low weight, as a means of mitigating the impact of the deployed airbag upon the occupant.

The linear density of the filaments comprising the yarn bundle may be manipulated in order to balance the many requirements to be met by a serviceable fabric. Associated with the use of yarn of high linear densities, in excess of seven hundred (700) dtex, for example, filament densities in excess of six (6) dtex, have been employed in air bags fabrics. Representative of such a fabric is that described in Japanese Patent 07/300,054-A (Toray Industries, Inc.). Whereas combinations of linear densities of yarn and filament of the type cited above give the required strength at low weaving intensities, and whereas yarns of high mechanical quality can be provided, because the filament linear density is high, the fabrics exhibit high stiffness and high permeability.

The problem of high permeability may be addressed by the coating of the fabric, or by means of dimensional contraction of the fabric after weaving. The dimensional contraction may be accomplished through suitable post-treatment, either by dry or wet methods, that entail effecting shrinkage of the fabric. Representative of such a treated fabric is that described in EPO Patent EP 436,950 (AKZO NV.). The consequence of both approaches is that penalties are incurred in the form of higher stiffness and bulk, and increased complexity and cost of fabrication.

The problems of high stiffness and high permeability may be addressed by the device of lowering the linear density of the yarn, and of the filaments comprising the yarn. Yarn linear densities in the range of seven hundred (700) to two hundred (200) dtex have been proposed, and filament deniers from six (6) dtex to three (3) dtex, and even below three (3) dtex, have been proposed. Representative of such a fabric is that described in Japanese Patent J 04/209,846-A (Toyobo KK). The drive towards the lowering of the filament denier is greater: a) for polyester yarns than it is for polyamide yarns; and, b) as the tightness of the fabric is increased, through either the choice of the sett, or by means of post-treatment.

The linear density of the yarn is lowered at the expense of the strength of the airbag fabric, even with the concomitant increase in weaving intensity. And when the linear density of the filament comprising the yarn is lowered, the difficulty of achieving yarn of high mechanical quality is increased, it becomes more difficult to achieve high weaving efficiencies, and high mechanical quality of the woven fabric.

In view of the foregoing it is believed to be advantageous to provide a fabric for manufacturing air bags which best balances the requirements of high strength and low permeability, under test and practical conditions, while also providing a fabric which is flexible and is not bulky and heavy, and which is also inexpensive to manufacture and further process.

SUMMARY OF THE INVENTION

The present invention is directed toward a woven synthetic filament fabric for manufacturing an airbag. The fabric has a first plurality M of synthetic multifilament yarns extending in a warp direction and a second plurality N of synthetic multifilament yarns extending in a fill direction, with the fill direction being substantially perpendicular to the warp direction. The number of yarns M, N in the warp and the fill directions of the fabric, respectively, being directly related to the linear density of the yarns. Preferably, the synthetic multifilament yarns are polyamide yarns, and most preferably, are nylon 6,6 yarns.

In accordance with the present invention, the airbag fabric is improved in that each of the yarns in the first and second plurality have an individual filament count of about one hundred (100) to about one hundred twenty-five (125) filaments per yarn. Each of the yarns in the first and second plurality have a yarn linear density (dtex) of about five hundred fifty (550) to about six hundred fifty (650). The dimensions of the fabric are substantially unaltered after weaving. By "substantially unaltered" it is meant that the dimensions of the fabric are unchanged beyond the changes in fill yarn weave crimp normally effected in fabric finishing, and no specialized fabric treatments, such as a hot-wet treatment, are used.

The fabric has a Strength-Weighted Dynamic Permeability (SWDP) in the range from about 0.1 to about 0.3, and more preferably, in the range from about 0.20 to about 0.25. The Strength-Weighted Dynamic Permeability (SWDP) is defined in accordance with the relationship:

$$SWDP = \frac{(K) \cdot (F)}{S} \qquad (3)$$

wherein:

K is the D'Arcy Law dynamic permeability, in (liter millimeter)/[decimeter$^2$·min·kiloPascal] for the fabric, F is the Circular Bend Stiffness in units of Newtons for the fabric, and S is the tongue-tear strength, in units of Newtons for the fabric.

An airbag fabric having a Strength-Weighted Dynamic Permeability within the foregoing ranges is believed to define the optimum combination of strength, low air permeability, and flexibility.

BRIEF DESCRIPTION OF THE DRAWING

FIG. 1, the sole FIGURE of the present application, is a graphical depiction of Strength-Weighted Dynamic Permeability, as a function of the yarn linear density.

DETAILED DESCRIPTION OF THE INVENTION

The present invention will be more fully understood from the following detailed description thereof taken in connection with drawing FIG. 1.

In accordance with the present invention is has been found an airbag fabric that has a Strength-Weighted Dynamic Permeability ("SWDP") within the range of about 0.10 to about 0.30, and more particularly, in the range from 0.20 to about 0.25, best balances the requirements of high strength and low permeability under test and practical conditions, while also providing a fabric which is flexible and is not bulky and heavy, and which is also inexpensive to manufacture and further process. The broad range is indicated by the dashed lines in FIG. 1.

Derivation of the Strength-Weighted Dynamic Permeability ("SWDP")

Inspection of fabric property tables reveals that the properties of any specific fabric used to manufacture an airbag are usually the result of a series of fabric property "trade-offs". For example, in a given airbag fabric a degree of fabric strength may be traded for fabric flexibility. In another instance fabric thinness may be tempered by the ability of the fabric to resist "burnthrough" by hot particulates from pyrotechnic inflator systems. In other instances, low air permeability is balanced against fabric cost.

As a result of such trade-offs, comparison of the properties of one fabric against another of another fabric is difficult. U.S. Pat. No. 5,508,073 (Krummheuer et al.) discloses an index, termed "Specific Stiffness", provided for the purpose of comparing different fabrics. Specific Stiffness is affected by the yarn linear density and the air permeability as an indirect measure of the fabric density.

Specific Stiffness is calculated according to the following formula:

$$\text{Specific Stiffness} = \frac{(\text{Bending Stiffness}) \cdot (\text{Air Permeability})}{\text{Linear Density}} \qquad (1)$$

The Bending Stiffness is obtained by means of the "cantilever method" in which the moment needed to deflect the end of a sample is measured. Bending Stiffness is a measure of fabric flexibility. The so-called "Air Permeability" term in Equation (1) is actually the rate of transmission of air through the fabric (hereinafter referred to as "Air Transmission Rate", or "ATR"). ATR is expressed in units of volume/per unit cross-sectional area of fabric/per unit time, under the influence of a pressure of 0.50 kPa.

Although the inclusion of the linear density of the fabric in the denominator of Equation (1) may engender a contradiction, the premise to use as the numerator the product of a measure of fabric flexibility and the ATR has a sound practical basis. This premise provides a useful starting point for the development of the Strength-Weighted Dynamic Permeability ("SWDP") in accordance with the present invention. However, as will be developed, Strength-Weighted Dynamic Permeability is a measurement index which is believed to be more reflective of the desirability of a fabric for airbag use, since SWDP incorporates considerations of fabric thickness and fabric strength, in addition to fabric flexibility and ATR.

Division of the product of fabric thickness and ATR by the pressure driving the air through a porous medium generates a permeability parameter of the medium. A useful permeability parameter may be defined by use of D'Arcy's Law, the principle on which the study of the flow of fluids through porous media is based. The D'Arcy Law dynamic permeability parameter "K" is given by the relationship:

$$K = \frac{(\text{thickness}) \cdot (ATR)}{\text{Pressure applied across a porous medium}} \qquad (2)$$

Given the priority attached to ensuring that a fabric does not tear during assembly in the airbag module or in deployment, an appropriate strength parameter is the tearing strength of the woven fabric. This parameter, hereinafter referred to by the reference character "S", may be defined by the Tongue Method, in accordance with ASTM D2261, titled "Standard Test Method for Tearing Strength of Woven Fabrics (Single Rip Method (Constant Rate of Expansion Tensile Testing Machine)]".

As a measure of fabric flexibility the Circular Bend Procedure may be used. The Circular Bend Procedure is defined in accordance with ASTM D4032, titled "Standard Test Method for the Stiffness of Fabric by the Circular Bend Procedure". The Circular Bend Procedure gives a force value related to fabric stiffness, simultaneously averaging stiffness in all directions. This force value is hereinafter referred to by the reference character "F".

Combining the foregoing considerations, the Strength-Weighted Dynamic Permeability ("SWDP") in accordance with this invention may be defined as:

$$SWDP = \frac{(K) \cdot (F)}{S} \qquad (3)$$

where

K is the D'Arcy Law Permeability, in units of (liter·millimeter)/[decimeter$^2$·min·kiloPascal)] i.e., {l·mm/dm$^2$·min·kPa}

F is the Circular Bend Stiffness, in units of Newtons (N); and

S is the Tongue Tear Strength, in units of Newtons (N).

It is noted from Equation (3) that division by an important measure of the strength of the fabric then creates an Index (the SWDP) whereby low values are indicative of high functionality of the fabric, in terms of its permeability, strength, flexibility and bulk.

—o—0—o—

Dynamic Permeability

It is worthy of emphasis that in Equation (2) the permeability term is a "dynamic", and not a "static", value. The permeability of a porous medium may display dependence upon the pressure applied to it. This dependence is described analytically by the introduction of an exponent into the relationship between ATR and applied pressure which takes values as follows:

$$ATR = \frac{K(\text{applied pressure})^{E-1} \cdot \text{pressure}}{\text{thickness}} \quad (4)$$

where,

E>1, when the ATR increases more rapidly with pressure than expected by "linear" behavior over the range of applied pressures [i.e., when K in Equation (2) remains constant]; and E<1, when the ATR increases less rapidly with pressure than if the medium were linear.

Fabrics may display linear behavior, or the two above-mentioned forms of non-linearity, depending upon their construction and their method of manufacture. Consequently, it becomes appropriate to indicate whether ATR values were obtained under "Static" or "Dynamic" conditions. "Static" permeability is measured under the low pressures associated with the standard fabric permeability test methods (e. g., 0.125 kPa according to ASTM D737, titled "Standard Test Method for Air Permeability of Textile Fabrics") or up to a pressure of 0.50 kPa. "Dynamic" permeability is measured at higher pressures designed to simulate more closely practical conditions (2.5 kPa is applied).

Dynamic Permeabilities greater than the Static Permeabilities occur when the porosity of the fabric is raised by the application of high pressures. This comes about most likely by the distortion of the fabric leading to the creation of regions of the fabric through which the air may "bypass". A fabric with these characteristics is said to display "Progressive" behavior.

Dynamic Permeabilities lower than the Static values result from occurrence of some compaction of the fabric under the applied pressure, without portions of the fabric "giving way" to a degree. This is so-called "Digressive" behavior. A fabric which remains linear between Static and Dynamic test conditions does so because it has been created in a way that its microporous structure is very stable.

Fabric "Tightness"

For a square fabric the tightness expression developed by Love, [A. Sayem and Aly El, Shiekh, "*Mechanics of Woven Fabrics Part IV: Critical review of Fabric Degree of Tightness and its Applications*", Textile Res. J. Vol. 64(11), 653–662 (1994)] using standard fabrics of maximum construction based upon his theoretical work, can be written as:

$$\text{Tightness} = \frac{\text{actual sett}}{\text{Maximum theoretical sett}} \quad (5)$$

The maximum theoretical sett defines the center-to-center distance of adjacent threads when they are as close together as possible without distortion of their circular cross section. For a square plain fabric, this distance is 1.7321 multiplied by the diameter of the thread.

Fabric "Contraction"

The change in dimension of a fabric between weaving and finishing, either as an extension or a shrinkage of the fabric, may be estimated from the equation given in Lord and Mohamed, "*Weaving: Conversion of Yarn to Fabric*", $2^{nd}$ Ed., Merrow Technical Library (1982):

$$\text{Fabric extension} = \frac{(A-B)}{(1+B)} \quad (6)$$

where

A=Gray fabric crimp factor; and

B=Finished fabric crimp factor

An estimate of the finished fabric crimp factor may be obtained by back-calculation from the finished fabric areal density using the expression (shown below in its simplified form for a balanced square fabric, assuming that the amount of residual warp size is zero):

$$A_w = 0.002 \cdot \text{yarn linear density} \cdot \text{ends per cm} \quad (7)$$

The gray fabric crimp factor may be computed from known geometric relationships (cf., A. Sayem and Aly El, Shiekh, "*Mechanics of Woven Fabrics Part III: Critical review of Weavability Limit Studies*", Textile Res. J. Vol. 63(7), 371–378 (1993)].

Fabric "Porosity"

The fraction of the area of a fabric covered by circular warp and fill yarns is expressed simply by the ratio of the diameter of the yarn to the spacing between them. This parameter is referred to as the fractional cover. Stemming from Peirce's work (cf., John B, Dickson, "*Practical Loom Experiments on Weavability Limit Studies*", Textile Res J., December 1954, pp. 1083–1093) on cotton fabrics, various "Cover Factors" have been derived. The bulk density of a fabric is obtained by dividing the areal density by the thickness of the fabric. The Packing Factor is then obtained by dividing the bulk density by the specific gravity of the yarn material. The porosity is (1-Packing Factor).

Under the influence of weaving tensions, threads comprising a fabric will flatten. Flattening is advantageous in that firmness is imparted to the fabric, that is, i: is stabilized, while through the reduction in thickness, the fabric is rendered more flexible. Additionally, the areal "cover" provided by the fabric is raised, as is its bulk density, associated with which is a lowering of the fabric porosity.

The fractional cover of a fabric comprised of threads which have been compressed by the tensions imparted in weaving is expressed by the compressed width of the threads divided by the spacing between them. In a plain weave construction, the shape of the compressed thread is reasonably represented as elliptical. The elliptical geometric parameters, that is the major and minor axes of the ellipse, are related by simple analytical expressions to the diameter of the circle from which the elliptical shape was obtained by deformation.

If the minor axis, b, corresponding to its thickness, is obtained by dividing the actual thickness of a fabric by two, the major axis, L, corresponding to its width, is given by:

$$L = d^2/b \quad (8)$$

where d is the diameter of the circular thread.

The circumference of the elliptical shape is related to the complete elliptical integral of the first kind

Manufacture

Polyamide yarns useful for the fabric of the present invention may be manufactured according to a traditional melt spinning process. Any polyamide homopolymers and copolymers may be used for the yarn woven into the fabric in accordance with the present invention. Such polyamides are predominately aliphatic, i. e. less than eighty-five percent (85%) of the amide-linkages are attached to two aromatic rings. Widely used nylon polymers such as poly (hexamethylene adipamide) (nylon 6,6); poly(e-caproamide) (nylon 6); and their copolymers can be used. Nylon 6,6 is most preferred. Other nylon polymers which may be advantageously used are nylon 12, nylon 46, nylon 6, 10 and nylon 6, 12.

In a preferred case nylon 6,6 multifilament yarns are melt spun by extrusion of a polymer through a multi-capillary spinneret plate, and cooled with humidified quench air in a quench zone. The polymer can have a relative viscosity in the range from sixty (60) to eighty (80) Filaments are converged and oiled [oil on yarn is one percent (1%)], withdrawn as a yarn from the quench zone, and drawn in two coupled stages at a total draw ratio in excess of 4.0, interlaced and wound-up as a yarn package at speeds in excess of two-thousand meters per minute (2000 m/min.) for subsequent processing into fabric. The particular draw ratio and wind-up speed for any given installation can be readily determined by one skilled in the art.

The preferred yarn linear density was five-hundred-eighty-five (585) dtex [five-hundred-twenty-five (525) denier] with one-hundred-five (105) filaments per yarn. This yarn linear density and number of filaments was particularly easy to melt spin. Primarily this ease of spinning was due to the air quench immediately below the spinneret plate being readily accessible to the filament bundle. As a result, the filament cooling profile was more consistent and quench air acted uniformly upon each filament of the yarn. Such consistency may be revealed by uniform filament-to-filament cross-sectional birefringence profiles and the extremely small numbers of broken filaments incurred in the subsequent coupled drawing steps (a very practical consideration).

Packaged yarn produced as described was processed into fabric using known weaving apparatus, such as a water-jet loom or a rapier-loom. The fabric construction is preferably a plain weave, with a substantially balanced squared sett. The number of yarns in the warp and in the fill directions of the fabric was selected directly in accordance with the linear density of the yarns using the well-known weaving industry practice. U.S. Pat. No. 5,508,073 (Krummheuer et al.) discloses various examples of the relationship between yarn linear density and the number of yarns in the warp and fill directions. In accordance with such practice, for a five-hundred-eighty-five (585) dtex, one-hundred-five (105) filament yarn there are preferably from about sixteen (16) to about twenty (20) yarns per centimeter in both the warp and the fill directions.

The tightness of the weaving, combined with the cohesive strength of the bundle of filaments comprising the yarn, fundamentally govern the extent to which a circular thread will deform under the tensions of weaving. The cohesive strength is related to the surface area per unit volume of the filaments, and the number of filaments comprising the bundle.

Fabric in accordance with the present invention are tightly woven. By "tightly woven" it is meant that the actual sett chosen is a high fraction of the maximum theoretical sett defined earlier. In practice of the present invention, the sett is in the range from about 0.7 to about 0.8, and more particularly, in the range from about 0.75 to about 0.78.

It is a surprising feature of this invention that the number of filaments and the surface area per unit volume of the filaments in the claimed ranges of yarn linear density and number of filaments, is such that the "affine deformation" of the threads advantageously creates fabrics of surprisingly low thickness and low porosity. As a consequence of the degree of flattening the structure of the fabrics is surprisingly stable under conditions of dynamic air permeability testing designed to effectively simulate the behavior of a fabric under practical deployment conditions.

To the extent that a fabric structure is stable, its performance upon deployment will be predictable. This is most likely to be obtained by choosing yarn and filament linear densities, from which to construct the fabric, and a minimum essential tightness of a well-balanced weave, such that the specified Static permeability is met without recourse to post-treatment designed to alter the dimensions of the fabric, which may serve to create a fabric microstructure which is destabilized by sudden application of the deploying pressure.

After weaving, the fabric was finished according to standard practice, such as heat-setting in a stenter frame. As is normal, such finishing resulted in changes in fill yarn weave crimp which altered the dimension of the fabric. Beyond this, however, the dimension of the fabric was substantially unaltered. By "substantially unaltered" it is meant that the dimensions of the fabric after weaving remained unchanged. The finished fabric was not subjected to any treatment, such as a hot-wet shrinkage, which would result in a dimensional change to the fabric.

Post-treatment

It is noteworthy that fabrics which are known to have been post-treated to achieve low static permeability, while they tend to have porosities roughly equivalent to those of fabrics obtained in a more straightforward manner, display higher tortuosities of the path taken by the fluid through the structure. This is suggested by computations based upon the work P. C. Carmen, ["Flow of Gases Porous Media ", Butterworth (1956)] and J. Kozeny, [Ber. Wien. Akad., Vol 136a, 271 (1927)]:

$$\text{tortuosity} = \frac{\text{porosity} \cdot m^2 \cdot (\text{pressure/thickness})}{ATR \cdot \text{kinematic viscosity}} \quad (9)$$

where $$m = \frac{\frac{1}{2} \text{ radius of the fiber} \cdot \text{porosity}}{\text{packing factor}} \quad (10)$$

The higher the tortuosity imparted to a fabric, that is, the higher the interstitial resistance to fluid flow, the more likely it is that the fabric will be susceptible to destabilization by the high flow rates of fluids directed at it, driven by high pressures, and fluid "bypass" through regions of the fabric will be more likely.

While fabrics displaying values of the SWDP Index below 0.20 might conceivably be manufactured using complex fabric constructions, and/or complex post-treatments, and while these fabrics may display very low permeabilities, it will be also evident that low values of tear strength (for example) are attributed to them, without their necessarily displaying high flexibility. Similar indications of poor balance of properties will be evident in fabrics to which values of the SWDP Index above about 0.30 may be assigned, high stiffness and bulk being mostly likely evident. Fabrics with values of SWDP outside the range of about 0.10 to about 0.30 do not offer the prospect of enhanced reliability in use, and/or in packability of the fabric in the system module.

Coating

The fabric of the present invention are preferably uncoated. However, post-treatment of airbag fabrics usually does involve coating of the fabric, typically with either elastomeric or thermoplastic resins. Coating affects the fabric's permeability at the expense of fabric property balance. Notably, fabric stiffness and bulk are increased, but packability is adversely affected. However, coating a fabric may result in an SWDP below 0.20. Accordingly, it should be understood that a lightly coated airbag fabric is to be construed as lying within the scope of the present invention. By "lightly coated" it is meant a fabric that has a coating of up to about one-hundred (100) grams of resin per square meter of fabric. Coating levels in this range result in a coating thickness of about ten percent (10%) or less of the thickness of the uncoated fabric. An airbag fabric having a coating as described is disclosed in EPO Patent EP-763621-A2 (Toray Ind.)

The present invention is further illustrated by the Examples which follow herein. The following test methods were used to measure the properties described in the Examples.

Test Methods

Fabric Gauge

The average thickness of the woven fabric was measured by observing the linear distance that a movable plane is displaced from a parallel surface by the fabric while under a specified pressure, in accordance with ASTM D1777, Titled "Standard Method for Measuring Thickness of Textile Materials".

Static Low Pressure Air Permeablility Test of Woven Fabrics

The air permeability of the woven fabric was measured by using a commercial air permeability tester, such as the Testex FX 3300 Air Permeability Tester, having an orifice with a cross-sectional area of thirty-eight (38) cm$^2$ under a differential pressure of one-hundred-twenty-five Pascals (125 Pa), in accordance with the earlier-referenced ASTM Standard D737.

Dynamic Air Permeability of Woven Fabrics

The air permeability of the woven fabric was measured using Testex FX 3350 Air Permeability Tester, having an orifice with a cross-sectional area of thirty-eight (38) cm$^2$ under a differential pressure of twenty-five-hundred Pascals (2500 Pa).

Warp and Fill Tongue Tear

The Standard Test Method for Tearing Strength of Woven Fabrics by the Tongue (Single Rip) Method in accordance with earlier-referenced ASTM D2261 was used. The tearing strength is determined by pulling on two "tongue" formed in a rectangular specimen by cutting in the center of the shorter edge.

Stiffness of the Woven Fabric

The maximum force required to push a slat folded swatch of fabric through an orifice in a platform is used as an indication of the fabric stiffness (resistance to bending) in the Circular Bend Procedure in accordance with earlier-referenced ASTM Standard D4032.

Relative Viscosity

Relative viscosity is the ratio of the viscosity of an 8.4% solution (by weight) of polymer in ninety percent (90%) formic acid to the absolute viscosity of ninety percent (90%) formic acid.

EXAMPLES

Examples 1 and 2 comprise a first series ("Series 1") of examples of the fabric of the present invention, shown by diamond characters in FIG. 1.

Example 1

A five-hundred-eighty-five (585) dtex, one-hundred-five (105) filament nylon 6,6 yarn, the filament linear density accordingly being about 5.5 dtex, was used to manufacture an air bag fabric by plain weaving with about eighteen (18) threads per cm [forty-five (45) threads per inch] in warp and fill, corresponding to a fabric Tightness, by the Love formula [Equation (5)], of 0.78.

The fabric was treated by a dry finishing method without contraction of the fabric due to the treatment, within the accuracy of the method of estimation.

The uncoated fabric, with a thickness of 0.305 mm (0.012 inch) and an areal density of two-hundred-twenty (220) gm/sq.m, corresponding to a packing factor of 0.635, and therefore a porosity of 0.365, was found to have a D'Arcy Law Static Permeability of 5.2 l.·mm/dm$^2$·min·kPa (at 0.125 kPa), and a D'Arcy Law Dynamic Permeability of 5.2 l·mm/dm$^2$·min·kPa (at 2.5 kPa).

The warp and fill Tongue Tear Strengths were found to be forty-five (45) lb$_f$ and forty-four (44) lb$_f$, respectively [about two-hundred (200) N and one-hundred-ninety-six (196) N, respectively], and the fabric stiffness was measured by the Circular Bend Procedure to be 1.8 lb$_f$ [about eight (8) N].

The Strength-Weighted Dynamic Permeability was thus computed to be 0.208 l·mm/dm$^2$·min·kPa. This value of SWDP is indicated at reference character "I-1" in the graphical depiction of FIG. 1.

Example 2

A five-hundred-eighty-five (585) dtex, one-hundred-five (105) filament nylon 6,6 yarn, the filament linear density accordingly being about 5.5 dtex, was used to manufacture an air bag fabric by plain weaving with about seventeen (17) threads per cm [forty-three (43) threads per inch] in warp and fill, corresponding to a fabric Tightness, by the Love formula, of 0.75.

The fabric was treated by a dry finishing method without contraction of the fabric due to the treatment, within the accuracy of the method of estimation.

The uncoated fabric, with a thickness of 0.33 mm (0.013 inch) and an areal density of two-hundred-twenty (214) gm/sq.m, corresponding to a packing factor of 0.576, and therefore a porosity of 0.424, was found to have a D'Arcy Law Static Permeability of 8.0 l·mm/dm$^2$·min·kPa (at 0.125 kPa), and a D'Arcy Law Dynamic Permeability of 6 l·mm/dm$^2$·min·kPa (at 2.5 kPa)

The fabric stiffness was measured by the Circular Bend Procedure to be 1.6 lb$_f$ (about 7 N). The warp and fill Tongue Tear Strengths were found to forty-five (45) lb$_f$ and forty-seven (47) lb$_f$, respectively [about two-hundred (200) N and two-hundred-nine (209) N, respectively].

The Strength-Weighted Dynamic Permeability was thus computed to be 0.240 l·mm/dm-·min·kPa. This value of SWDP is indicated at reference character "I-2" in the graphical depiction of FIG. 1.

Examples 3 and 4 comprise a second series ("Series 2") of comparative examples of fabric, indicated by the square character in FIG. 1.

Example 3

A comparative experiment with a seven-hundred (700) dtex, one-hundred-five (105) filament yarn, corresponding to a filament linear density of about 6.6 dtex, was used to manufacture an air bag fabric by plain weaving with about sixteen (16) threads per cm [forty-five (41) threads per inch] in warp and fill, corresponding to a fabric tightness, by the Love formula, of 0.78.

The fabric was finished under the same conditions as those employed in Example 1, without contraction of the fabric due to the treatment, within the accuracy of the method of estimated.

The uncoated fabric, having a thickness of 0.40 mm (0.016 inch) and an areal density of two-hundred-forty-four (244) gm/sq.m, corresponding to a packing factor of 0.527, and therefore a porosity of 0.473, was found to have a D'Arcy Law Static Permeability of 15.86 l·mm/dm$^2$·min·kPa (at 0.125 kpa), and a D'Arcy Law Dynamic Permeability of 12.88 l·mm/dm$^2$·min·kPa (at 2.5 kPa)

The fabric stiffness was measured by the Circular Bend Procedure to be 1.9 lb$_f$ (8.45 N). The warp and fill Tongue Tear Strengths were found to be fifty-six (56) lb$_f$ and fifty-seven (57) lb$_f$, respectively [about two-hundred-forty-nine (249) N and two-hundred-fifty-three (253) N, respectively].

The Strength-Weighted Dynamic Permeability was thus computed to be 0.437 l·mm/dm$^2$·min·kPa. This value of SWDP is indicated at reference character "II-1" in the graphical depiction of FIG. 1.

Example 4

A comparative experiment with a four-hundred-seventy (470) dtex, sixty-eight (68) filament yarn, corresponding to a filament linear density of about 6.9 dtex, was used to manufacture an air bag fabric by plain weaving with about nineteen (9) threads per cm [forty-nine (49) threads per inch] in warp and fill, corresponding to a fabric tightness, by the Love formula, of 0.76.

The fabric was finished under the same conditions, without contraction of the fabric due to the treatment, within the accuracy of the method of estimation.

The uncoated fabric, having a thickness of 0.33 mm (0.013 inch) and an areal density of one-hundred-ninety-three (193) gm/sq. m, corresponding to a packing factor of 0.514, and therefore a porosity of 0.486, was found to have a D'Arcy Law Static Permeability of 34.57 l·mm/dm.$^2$min·kPa. (at 0.125 kPa), and a D'Arcy Law Dynamic Permeability of 13.3 l·mm/dm$^2$·min·kPa (at 2.5 kPa)

The fabric stiffness was measured by the Circular Bend Procedure to be 1.0 lb$_f$ (4.45 N). The warp and fill Tongue Tear Strengths were found to be thirty-three (33) lb$_f$ and thirty-two (32) lb$_f$, [about one-hundred-forty-seven (147) N and one-hundred-forty-two (142) N, respectively].

The Strength-Weighted Dynamic Permeability was thus computed to be 0.402 l·mm/dm$^2$·min·kPa. This value of SWDP is indicated at reference character "II-2" in the graphical depiction of FIG. 1.

Examples 5 through 8 are hypothetical examples. They comprise a third series ("Series 3") of examples of hypothetical fabric, as indicated by the triangular character in FIG. 1.

With respect to these Examples 5 through 8, the interpretation of the surprising outcome of obtaining fabrics which exceptionally met the balance of requirements for use in airbags was aided by developing and applying a computational framework, incorporating established relationships related to fabric geometry and mechanics, augmented by the excellent work describing the flow of fluids through porous media and aligned fiber masses due to (for example) J. G. Williams, C. E. M. Morris and B. C. Ennis in Polymer Engineering and Science, June 1974 Vol. 14, No. 6, pp. 413–420. The modeling of the deformation of circular threads to ellipses is based upon the treatment of affine deformation of shapes in distributive mixing theory.

The model so constructed makes possible the reliable estimation of the impact that weaving and finishing in the same manner as in Example 1 would have on five-hundred-eighty-five (585) dtex, one-hundred-five (105) yarn.

For the purpose of establishing the combination of ranges of the yarn and filament linear densities for yarns that have over which fabrics for airbag use may be formed advantageously, the model was applied with the assumptions being made that, at a weaving intensity corresponding to the tightness of Example 1 (viz., 0.78) the "linear" permeability behavior, as defined previously herein, displayed by the fabrics of Example 1, would be determined by the porosity resulting from contraction of the circular threads by affine deformation, at a tortuousity equivalent to that displayed by the fabric of invention Example 1, [viz., five-hundred (500)].

Example 5

A five-hundred-fifty (550) dtex, one-hundred (100) filament nylon 6,6 yarn, the filament linear density accordingly being about 5.5 dtex, with about eighteen (18) threads per cm [forty-five (45) threads per inch] in warp and fill, if woven to a fabric Tightness, by the Love formula, of 0.78, would likely exhibit a thickness of 0.316 (0.0125 inch) and an areal density of two-hundred-fourteen (214) gm/sq.m, corresponding to a packing factor of 0.594, and therefore a porosity of 0.406, in an uncoated fabric form.

If the fabric were finishing without contraction of the fabric due to the treatment, within the accuracy of the method of estimation, it would likely exhibit a D'Arcy Law Static Permeability of 6.64 l·mm/dm$^2$·min·kPa (at 0.125 kPa), and with "linear" permeability characteristics over the range of pressures from 0.125 kPa 0.50 kPa, a D'Arcy Law Dynamic Permeability of 6.64 l·mm/dm$^2$·min·kPa (at 2.5 kPa)

The Tongue Tear Strength of each warp and fill yarn would likely be forty-five (45) lb$_f$ [about two-hundred (200) N] and the fabric stiffness about 1.8 lb$_f$ [about eight (8) N].

The Strength-Weighted Dynamic Permeability would thus compute to be 0.240 l·mm/dm$^2$·min·kPa. This value of SWDP is indicated at reference character "III-1" in the graphical depiction of FIG. 1.

Example 6

A five-hundred-fifty (550) dtex, one-hundred-twenty-five (125) filament nylon 6,6 yarn, the filament linear density accordingly being about 4.4 dtex, with about eighteen (18) threads per cm [forty-five (45) threads per inch] in warp and fill, if woven to a fabric Tightness, by the Love formula, of 0.78, would likely exhibit a thickness of 0.298 (0.0117 inch)

and an areal density of two-hundred-fourteen (214) gm/sq.m, corresponding to a packing factor of 0.632, and therefore a porosity of 0.368, in an uncoated fabric form.

If the fabric were finishing without contraction of the fabric due to the treatment, within the accuracy of the method of estimation, it would likely exhibit a D'Arcy Law Static Permeability of 4.4 l·mm/dm$^2$·min·kPa (at 0.125 kPa), and with "linear" permeability characteristics over the range of pressures from 0.125 kPa 0.50 kPa, a D'Arcy Law Dynamic Permeability of 4.4 l·mm/dm$^2$·min·kPa (at 2.5 kPa)

The Tongue Tear Strength of each warp and fill yarn would likely be forty-five (45) lb$_f$ [about two-hundred (200) N] and the fabric stiffness about 1.35 lb$_f$ [about six (6) N].

The Strength-Weighted Dynamic Permeability would thus compute to be 0.132 l·mm/dm$^2$·min·kPa. This value of SWDP is indicated at reference character "III-2" in the graphical depiction of FIG. 1.

Example 7

A six-hundred-fifty (650) dtex, one-hundred (100) filament nylon 6,6 yarn, the filament linear density accordingly being about 6.5 dtex, with about sixteen-and-one-half (16.5) threads per cm [forty-two (42) threads per inch] in warp and fill, if woven to a fabric Tightness, by the Love formula, of 0.78, would likely exhibit a thickness of 0.329 (0.0130 inch) and an areal density of two-hundred-thirty-three (233) gm/sq.m, corresponding to a packing factor of 0.621, and therefore a porosity of 0.379, in an uncoated fabric form.

If the fabric were finishing without contraction of the fabric due to the treatment, within the accuracy of the method of estimation, it would likely exhibit a D'Arcy Law Static Permeability of 5.84 l·mm/dm.$^2$min·kPa. (at 0.125 kPa), and with "linear" permeability characteristics over the range of pressures from 0.125 kPa 0.50 kPa, a D'Arcy Law Dynamic Permeability of 5.84 l·mm/dm$^2$·min.kpa (at 2.5 kPa).

The Tongue Tear Strength of each warp and fill yarn would likely be forty-five (45) lb$_f$ [about two- hundred (200) N] and the fabric stiffness about 1.9 lb$_f$ [about eight and-one-half (8.5) N.].

The Strength-Weighted Dynamic Permeability would thus compute to be 0.221 l·mm/dm$^2$·min·kPa. This value of SWDP is indicated at reference character "III-3" in the graphical depiction of FIG. 1.

Example 8

A six-hundred-fifty (650) dtex, one-hundred-twenty-five (125) filament the filament linear density accordingly being about 5.2 dtex, with about sixteen-and-one-half (16.5) threads per cm [forty-two (42) threads per inch] in warp and fill, if woven to a fabric Tightness, by the Love formula, of 0.78, would likely exhibit a thickness of 0.324 (0.0128 inch) and an areal density of two-hundred-thirty-three (233) gm/sq.m, corresponding to a packing factor of 0.632, and therefore a porosity of 0.368, in an uncoated fabric form.

If the fabric were finishing without contraction of the fabric due to the treatment, within the accuracy of the method of estimation, it would likely exhibit a D'Arcy Law Static Permeability of 2.0 l·mm/dm$^2$·min·kPa. (at 0.125 kPa), and with "linear" permeability characteristics over the range of pressures from 0.125 kPa 0.50 kPa, a D'Arcy Law Dynamic Permeability of 2.0 l·mm/dm$^2$·min·kPa (at 2.5 kPa).

The Tongue Tear Strength of each warp and fill yarn would likely be forty-five (45) lb$_f$ [about two-hundred (200) N] and the fabric stiffness about 1.6 lb$_f$ [about seven (7) N].

The Strength-Weighted Dynamic Permeability would thus compute to be 0.132 l·mm/dm.$^2$min·kPa. This value of SWDP is indicated at reference character "III-4" in the graphical depiction of FIG. 1.

The results of the foregoing Examples 1 through 4 and Examples 5 through 8 are set forth in the following Table A and Table B, respectively.

TABLE A

| Parameter | Units | Invention experiment | Invention experiment | Comparative experiment | Comparative experiment |
|---|---|---|---|---|---|
| Example # | | 1 | 2 | 3 | 4 |
| Yarn linear density | dtex | 585 | 585 | 700 | 470 |
| No. of filaments | | 105 | 105 | 105 | 68 |
| Filament linear density | dtex | 5.5 | 5.5 | 6.6 | 6.9 |
| Ends density (warp) | ends/cm | 18 | 17 | 16 | 19 |
| Pick density (fill) | picks/cm | 18 | 17 | 16 | 19 |
| Fabric Tightness | | 0.78 | 0.75 | 0.78 | 0.76 |
| Fabric thickness | mm | 0.305 | 0.33 | 0.40 | 0.33 |
| Areal density | gm/sq · m | 220 | 214 | 244 | 193 |
| Air Transmission Rate @ a pressure of | l · mm/dm$^2$ · min kPa | 2.14 0.125 | 3.05 0.125 | 4.88 0.125 | 13.1 0.125 |
| Air Transmission Rate @ a pressure of | l · mm/dm$^2$ · min kPa | 42.7 2.5 | 51.8 2.5 | 79.25 2.5 | 100.58 2.5 |
| Darcy's Law Static Permeability | l · mm/dm$^2$ · min · kPa | 5.2 | 8.0 | 15.8 | 34.57 |
| Darcy's Law Dynamic Permeability | l · mm/dm$^2$ · min · kPa | 5.2 | 6.8 | 12.9 | 13.3 |
| Fabric Stiffness | N | 8 | 7 | 8.45 | 4.5 |
| Tear Strength (warp) | N | 200 | 200 | 249 | 147 |
| Strength-weighted Dynamic Permeability | l · mm/dm$^2$ · min · kPa | 0.208 | 0.240 | 0.437 | 0.402 |

TABLE B

| Parameter | Units | Hypothetical experiment | Hypothetical experiment | Hypothetical experiment | Hypothetical experiment |
|---|---|---|---|---|---|
| Example # | | 5 | 6 | 7 | 8 |
| Yarn linear density | dtex | 550 | 550 | 650 | 650 |
| No. of filaments | | 100 | 125 | 100 | 125 |
| Filament linear density | dtex | 5.5 | 4.4 | 6.5 | 5.2 |
| Ends density (warp) | ends/cm | 18 | 18 | 16.5 | 16.5 |
| Pick density (fill) | picks/cm | 18 | 18 | 16.5 | 16.5 |
| Fabric Tightness | | 0.78 | 0.78 | 0.78 | 0.78 |
| Fabric thickness | mm | 0.316 | 0.30 | 0.33 | 0.324 |
| Areal density | gm/sq · m | 214 | 214 | 233 | 233 |
| Air Transmission Rate | $l \cdot mm/dm^2 \cdot min$ | 2.94 | 1.85 | 2.22 | 2.0 |
| @ a pressure of | kPa | 0.125 | 0.125 | 0.125 | 0.125 |
| Air Transmission Rate | $l \cdot mm/dm^2 \cdot min$ | 52.6 | 34.8 | 46.2 | 41.1 |
| @ a pressure of | kPa | 2.5 | 2.5 | 2.5 | 2.5 |
| Darcy's Law Static Permeability | $l \cdot mm/dm^2 \cdot min \cdot kPa$ | 6.64 | 4.4 | 5.84 | 5.2 |
| Darcy's Law Dynamic Permeability | $l \cdot mm/dm^2 \cdot min \cdot kPa$ | 6.64 | 4.4 | 5.84 | 5.2 |
| Fabric Stiffness | N | 8 | 6 | 8.5 | 7 |
| Tear Strength (warp) | N | 200 | 200 | 225 | 225 |
| Strength-weighted Dynamic Permeability | $l \cdot mm/dm^2 \cdot min \cdot kPa$ | 0.27 | 0.130 | 0.221 | 0.162 |

Discussion of the Results

The following observations regarding the above Examples may be made.

Example 1

The fabric from the yarn of five-hundred-eighty-five (585) dtex linear density, woven tightly with a tightness of 0.78, has the expected strength, while the thickness and flexibility of the fabric is advantageously below that expected to be associated with a yarn of this linear density. High bulk density of the fabric has been achieved without the fabric being heavy, by accomplishing a high degree of flattening of the fabric under the tensions of weaving. This response results from the choice of the number of filaments comprising the yarn bundle, and the linear density of those filaments.

The Static permeability is such that the Static Air Transmission Rate is satisfactorily below the commonly suggested upper limit of ten (10) $l/dm^2 \cdot min$. The low porosity has been accomplished without resort to contraction of the fabric after weaving. The porosity of the fabric is stable over a wide range of applied pressures It is surprising that testing at elevated pressures, selected to better simulate deployment conditions, indicate that the permeability characteristics of the fabric are unaffected by the application of the higher pressures, suggesting that the fabric's microporous structure has not been destabilized. It is apparent that the fabric construction is so stable that it has not even been compressed by the higher applied pressures. This is particularly beneficial to the reliable operation of the fabric in deployment.

Example 2

The fabric from the yarn of five-hundred-eighty-five (585) dtex linear density, woven tightly with a tightness of 0.75, has the expected strength, while the thickness and flexibility of the fabric is advantageously below that expected to be associated with a yarn of this linear density. The Static permeability is such that the Static Air Transmission Rate is satisfactorily below the commonly suggested upper limit of ten (10) $l/dm^2 \cdot min$. Testing of the permeability characteristics at higher pressures suggest that the fabric's microporous structure has not been destabilized: the fabric appears to have undergone only slight compression.

Example 3

In this comparative example, while the number of filaments comprising the yarn bundle has been maintained at one-hundred-five (105), the linear density of the filaments has been raised. The consequence is to increase the thickness and areal density of the fabric, at the same weaving tightness and finishing conditions as in invention Example 1. The Static and Dynamic Air Transmission Rates are increased, as is the stiffness of the fabric. While the tear strength is increased, as expected, a poorer balance of properties is evidenced by the increase in the value of the Strength-Weighted Dynamic Permeability.

Example 4

In this comparative example, the yarn linear density has been decreased and the number of filaments comprising the yarn bundle has been decreased such that the linear density of the filaments has been raised. The consequence is that the thickness of the fabric is commensurate with that of the fabric from the yarn of linear density of five-hundred-eighty-five (585) dtex, at essentially the same weaving tightness, and the same finishing conditions, as in invention Example 2, and greater than that associated with the five-hundred-eighty-five (585) dtex yarn of invention Example 1. The Static and Dynamic Air Transmission Rates are increased.

While the fabric displays higher flexibility, the tear strength is diminished, as expected, and a poorer balance of properties is evidenced by the increase in the value of the Strength-Weighted Dynamic Permeability.

Example 5

If a plain woven fabric is constructed and treated as in the manner of invention Example 1, such that the "linear" permeability behavior is attained, but the number of filaments comprising the yarn bundle is lowered to one-hundred (100), while preserving the linear density of the filaments, the outcome would be expected to be a fabric with good tear strength, flexibility commensurate with the fabrics of the invention examples, and slightly higher Static and therefore Dynamic Air Transmission Rates. At fabric thicknesses commensurate with those associated with the invention examples, the Strength-Weighted Dynamic Permeability Index would be raised slightly above the values associated with the fabrics of the invention examples.

Example 6

If a plain woven fabric is constructed and treated as in the manner of invention Example 1, such that the "linear" permeability behavior is attained, but the number of filaments comprising the yarn bundle is lowered to one-hundred-twenty-five (125), while preserving the linear density of the yarn of Example 6, the outcome would be expected to be a fabric with good tear strength, flexibility commensurate with the fabrics of the invention examples, and slightly lower Static and therefore Dynamic Air Transmission Rates. At fabric thicknesses commensurate with those associated with the invention examples, the Strength-Weighted Dynamic Permeability Index would be lower than the values associated with the fabrics of the invention examples.

Example 7

If a plain woven fabric is constructed and treated as in the manner of invention Example 1, such that the "linear" permeability behavior is attained, but the number of filaments comprising the yarn bundle is lowered to one-hundred (100), while raising the linear density of the yarn above that associated with the invention examples, the outcome would be expected to be a fabric with improved tear strength, flexibility slightly lower than that displayed by the fabrics of the invention examples, and slightly higher Static and therefore Dynamic Air Transmission Rates. At fabric thicknesses slightly higher than those associated with the invention examples, balance of properties so obtained would lead to attaining a Strength-Weighted Dynamic Permeability Index commensurate with the values associated with the fabrics of the invention examples.

Example 8

If a plain woven fabric is constructed and treated as in the manner of invention Example 1, such that the "linear" permeability behavior is attained, but the number of filaments comprising the yarn bundle is raised to one-hundred-twenty-five (125), while preserving the linear density of the yarn of Example 8, the outcome would be expected to be a fabric with improved tear strength, flexibility commensurate with that displayed by the fabrics of the invention examples, and commensurate Static and therefore Dynamic Air Transmission Rates. At fabric thicknesses slightly higher than those associated with the invention examples, balance of properties so obtained would lead to attaining a Strength-weighted Dynamic Permeability Index lower than the values associated with the fabrics of the invention examples.

Those skilled in the art, having the benefit of the teachings of the present invention as set forth herein, may effect numerous modifications thereto. Such modifications are to be construed as lying within the contemplation of the present invention, as defined by the appended claims.

What is claimed is:

1. In a woven synthetic fabric for manufacturing an airbag, the fabric having a first plurality M of synthetic multifilament yarns extending in a warp direction and a second plurality N of synthetic multifilament yarns extending in a fill direction, the fill direction being substantially perpendicular to the warp direction, the number of yarns M, N in the warp and the fill directions of the fabric, respectively, being directly related to the linear density of the yarns, the improvement comprising:

each of the synthetic multifilament yarns in the first and second plurality is a polyamide yarn, each polyamide yarn having an individual filament count of about one hundred (100) to about one hundred twenty-five (125) filaments per yarn, and each of the yarns in the first and second plurality having a yarn linear density (dtex) of about five hundred fifty (550 dtex) to about six hundred fifty (650 dtex), the dimensions of the fabric being substantially unaltered after weaving, wherein the fabric has a Strength-Weighted Dynamic Permeability (SWDP) in the range from about 0.1 to about 0.3, wherein the Strength-Weighted Dynamic Permeability is defined in accordance with the relationship:

$$SWDP = \frac{(K) \cdot (F)}{S} \qquad (1)$$

wherein

K is the D'Arcy Law dynamic permeability, in units of (liter·millimeter)/[decimeter$^2$·min·kiloPascal) for the fabric, F is the Circular Bend Stiffness in units of Newtons for the fabric, and S is the tongue-tear strength, in units of Newtons for the fabric.

2. The fabric of claim 1 wherein the Strength-Weighted Dynamic Permeability (SWDP) is in the range from about 0.2 to about 0.25.

3. The fabric of claim 1 wherein the polyamide yarn is nylon 6,6.

* * * * *